(No Model.)

A. B. FOWLER.
ROLLING PIN.

No. 599,171.  Patented Feb. 15, 1898.

WITNESSES:
Paul Johns
Rev. G. Hoskins

INVENTOR
A. B. Fowler
BY
Munn
ATTORNEYS.

THE NORRIS PETERS CO., PHOTO-LITHO., WASHINGTON, D. C.

UNITED STATES PATENT OFFICE.

ANSON B. FOWLER, OF SHELTON, WASHINGTON.

ROLLING-PIN.

SPECIFICATION forming part of Letters Patent No. 599,171, dated February 15, 1898.

Application filed August 18, 1897. Serial No. 648,630. (No model.)

*To all whom it may concern:*

Be it known that I, ANSON B. FOWLER, of Shelton, in the county of Mason and State of Washington, have invented certain new and useful Improvements in Rolling-Pins, of which the following is a full, clear, and exact description.

The object of the invention is to provide a new and improved rolling-pin arranged for use either as an ordinary rolling-pin or as one with a flour-delivery for sprinkling the dough to be rolled, so as to prevent it from sticking or adhering to the pin.

The invention consists principally of two shells, one within the other and one turnable on the other to bring their perforations in or out of register, the inner shell forming the flour-receptacle.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
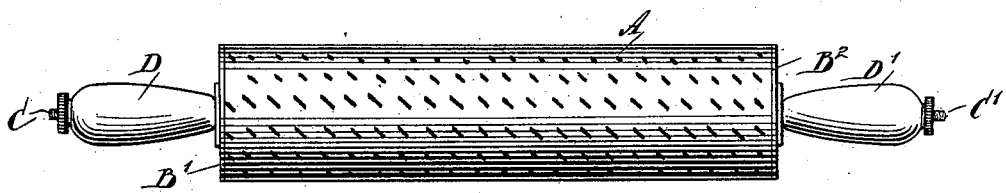
Figure 2:
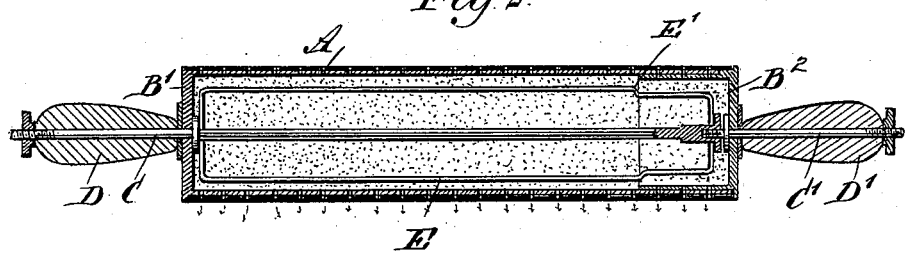
Figure 3:
Figures 4, 5:
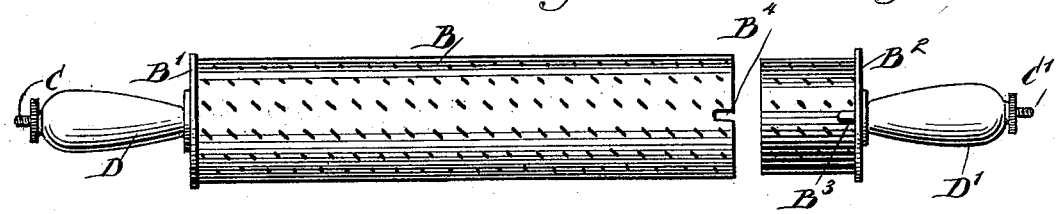
Figures 6, 7:
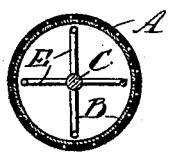

Figure 1 is a side elevation of the improvement. Fig. 2 is a sectional side elevation of the same. Fig. 3 is a side elevation of the outer shell. Fig. 4 is a similar view of the inner shell with one of the handles. Fig. 5 is a like view of the other handle. Fig. 6 is a transverse section of the improvement with the perforations in the shells in register with each other, and Fig. 7 is a like view of the same with the perforations out of register.

The improved rolling-pin is provided with an outer perforated shell A and an inner perforated shell B, on which the shell A is turnable to bring the perforations of the two shells in or out of register with each other. (See Figs. 6 and 7.) The inner shell B is provided at one end with a fixed head B', and the other end is adapted to be closed by a removable head $B^2$ in the form of a cap to permit of filling the inner shell with flour, the said head $B^2$ being provided with a pin $B^3$, adapted to engage a recess $B^4$ in the shell B to prevent the head from turning on the shell after the desired amount of flour is introduced. The head $B^2$ may be detached and used as a biscuit-cutter, if desired, thus always insuring a biscuit-cutter at hand on the pastry-table.

In the head B' is mounted to turn loosely a shaft C, and a similar shaft C' is mounted to turn centrally in the head $B^2$, and this shaft is screwed or otherwise fastened to the inner end of the shaft C, as is plainly indicated in Fig. 2. A flour-agitator E is secured to the shaft C for agitating the flour contained on the shell B, so that the said flour is not liable to ball, and consequently readily passes through the perforations in the shells A and B when the same are in register with each other, as shown in Fig. 6. The body of the agitator E is formed with shoulders E', as shown in Fig. 2, so that said body will lie as close to the inside of the inner shell B as it does to the inside of the head $B^2$.

The outer ends of the shafts C and C' are provided with suitable handles D D', respectively adapted to be taken hold of by the operator for rolling the pin—that is, the outer shell A—over the dough to be treated.

Now it will be seen that by the arrangement described the operator can make use of the device as an ordinary rolling-pin by turning the shell A on the shell B so that the apertures or perforations are out of register with each other. When it is desired, however, to sprinkle flour upon the dough during the process of rolling, so as to prevent the dough from sticking to the shell A, then the operator turns the shell A to bring the perforations of the shells A and B in register with each other, so that when the device is now used and rolled over the dough then the flour within the shell A passes through the registering apertures upon the dough to prevent the dough from sticking on the shell A.

It is understood that it is very desirable to automatically sprinkle flour upon the dough, especially when the latter is freshly mixed.

It will be observed that the parts of the rolling-pin are readily detachable, so as to permit of cleaning the device whenever necessary.

Having thus fully described my invention, I claim as new and desire to secure by Letters Patent—

1. A rolling-pin provided with two shells, one within the other and one turnable on the other, to bring their perforations in or out of register, the inner shell forming a flour-receptacle, substantially as shown and described.

2. A rolling-pin provided with two shells, one within the other and having registering perforations, and an agitator within the inner shell, for agitating the flour contained therein, substantially as shown and described.

3. A rolling-pin comprising two shells, one within the other and one turnable on the other, for bringing their perforations in or out of register, the inner shell forming a flour-receptacle, shafts journaled loosely in the heads of the inner shell, and handles held on the outer ends of the said shafts, substantially as shown and described.

4. A rolling-pin provided with two perforated shells, one within the other and one turnable on the other, for bringing their perforations in or out of register, the inner shell being provided with a fixed head at one end, and with a removable head at the other end, substantially as shown and described.

ANSON B. FOWLER.

Witnesses:
B. S. BARGER,
AL. J. MUNSON.